United States Patent
Jaiswal et al.

(10) Patent No.: US 9,860,847 B2
(45) Date of Patent: Jan. 2, 2018

(54) USING AN INTEGRATED SERVICES FOR DIGITAL NETWORK MESSAGE HEADER TO CONVEY A BATTERY STATE

(71) Applicant: International Business Machines Corporation, Armonk, NY (US)

(72) Inventors: Peeyush Jaiswal, Boca Raton, FL (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 14/580,302

(22) Filed: Dec. 23, 2014

(65) Prior Publication Data

US 2016/0183194 A1 Jun. 23, 2016

(51) Int. Cl.
*H04W 52/02* (2009.01)
*H04L 12/26* (2006.01)

(52) U.S. Cl.
CPC ......... *H04W 52/0261* (2013.01); *H04L 43/08* (2013.01); *Y02B 60/50* (2013.01)

(58) Field of Classification Search
CPC .............. H04W 52/0261; H04L 43/16; H04M 2203/4527
See application file for complete search history.

(56) References Cited

U.S. PATENT DOCUMENTS

| | | | |
|---|---|---|---|
| 6,236,326 B1 | 5/2001 | Murphy | |
| 7,099,693 B2 | 8/2006 | Shin | |
| 7,957,775 B2 * | 6/2011 | Allen, Jr. | H04W 8/22 455/343.2 |
| 8,010,167 B2 * | 8/2011 | Cotevino | H04W 4/16 370/311 |
| 8,077,837 B1 * | 12/2011 | Wright | H04L 51/14 379/88.12 |
| 8,200,292 B2 * | 6/2012 | Wu | H04M 1/72525 320/132 |
| 8,611,934 B2 | 12/2013 | Kuulusa et al. | |
| 8,644,204 B2 * | 2/2014 | Tao | H04W 52/02 370/311 |
| 8,687,616 B1 * | 4/2014 | Shipley | H04W 36/0022 370/338 |
| 2004/0214613 A1 * | 10/2004 | Shin | H04W 52/0277 455/567 |
| 2007/0167195 A1 * | 7/2007 | Su | H04W 28/20 455/574 |

(Continued)

OTHER PUBLICATIONS

Peeyush et al., "Using an ISDN Message Header to Support Time Zone Identification," U.S. Appl. No. 14/271,568, filed May 7, 2014.

*Primary Examiner* — Patrick Edouard
*Assistant Examiner* — Eboni Hughes
(74) *Attorney, Agent, or Firm* — Robert J. Shatto

(57) ABSTRACT

This disclosure includes a method and system for conveying battery state information about a mobile communication terminal to a third-party caller using a voicemail system and an Integrated Services for Digital Network (ISDN) message. A battery state indicator corresponding to the battery state of a mobile communication terminal is inserted into ISDN header and transmitted to a voicemail system. The voicemail system extracts the ISDN header and determines which voicemail message to send to third-party callers based on the battery state of the mobile communication terminal.

11 Claims, 6 Drawing Sheets

(56) References Cited

U.S. PATENT DOCUMENTS

2013/0002441 A1* 1/2013 Khan ................... H04L 67/306
340/636.1
2013/0308520 A1* 11/2013 Damnjanovic ... H04W 52/0277
370/315

* cited by examiner

USING AN INTEGRATED SERVICES FOR DIGITAL NETWORK MESSAGE HEADER TO CONVEY A BATTERY STATE

BACKGROUND OF THE INVENTION

The disclosure relates generally to telecommunications and more specifically to using an Integrated Services for Digital Network (ISDN) message header to convey a battery state about a mobile communication terminal.

Innovations in telecommunications technologies have made a wide range of enhanced telecommunications services available to users. For example, a user may dial a telephone number at the press of a key using speed-dialing, retrieve a telephone number for a missed call, send or retrieve voice messages following a missed call, and view a name and telephone number of a caller on a display of a mobile or landline telephone using caller identification (ID). A telecommunications provider often provides these services through a network, such as an intelligent services network (ISN), which is privately owned, but works in conjunction with a public switched telephone network (PSTN).

SUMMARY

Embodiments of the present invention disclose a method, computer program product, and system for conveying a battery state regarding a mobile communication terminal to a third-party caller using ISDN headers and a receiver. In an embodiment, this disclosure includes a method for communicating a battery state to a receiver. An application determines a battery state of a mobile communication terminal, and determines an appropriate battery state indicator by comparing the battery state to a battery threshold. After determining the appropriate battery state indicator, the application inserts the battery state indicator into a header of an Integrated Services for Digital Network header and initiates a call to a receiver, sending the ISDN message with the battery state indicator.

In another embodiment, this disclosure includes a method for transmitting the battery state of a mobile communication terminal to a third-party caller. A receiver (e.g. a computer system), that may provide voicemail services to a telecommunication network, accepts an incoming call and determines whether the call was made by a subscriber. If the call was made by a subscriber, the receiver extracts the ISDN header from the call and determines whether the header includes a low battery indicator. If the low battery indicator is present, the receiver sets the subscriber account to an alerting state.

Additional embodiments of this disclosure are directed to a computer system (e.g. receiver) for transmitting the battery state of a mobile communication terminal to a third-party caller.

The above summary is not intended to describe each illustrated embodiment or every implementation of the present disclosure.

BRIEF DESCRIPTION OF THE SEVERAL VIEWS OF THE DRAWINGS

The drawings included in the present disclosure are incorporated into, and form part of, the specification. They illustrate embodiments of the present disclosure and, along with the description, serve to explain the principles of the disclosure. The drawings are only illustrative of some embodiments and do not limit the disclosure.

Figure 1:
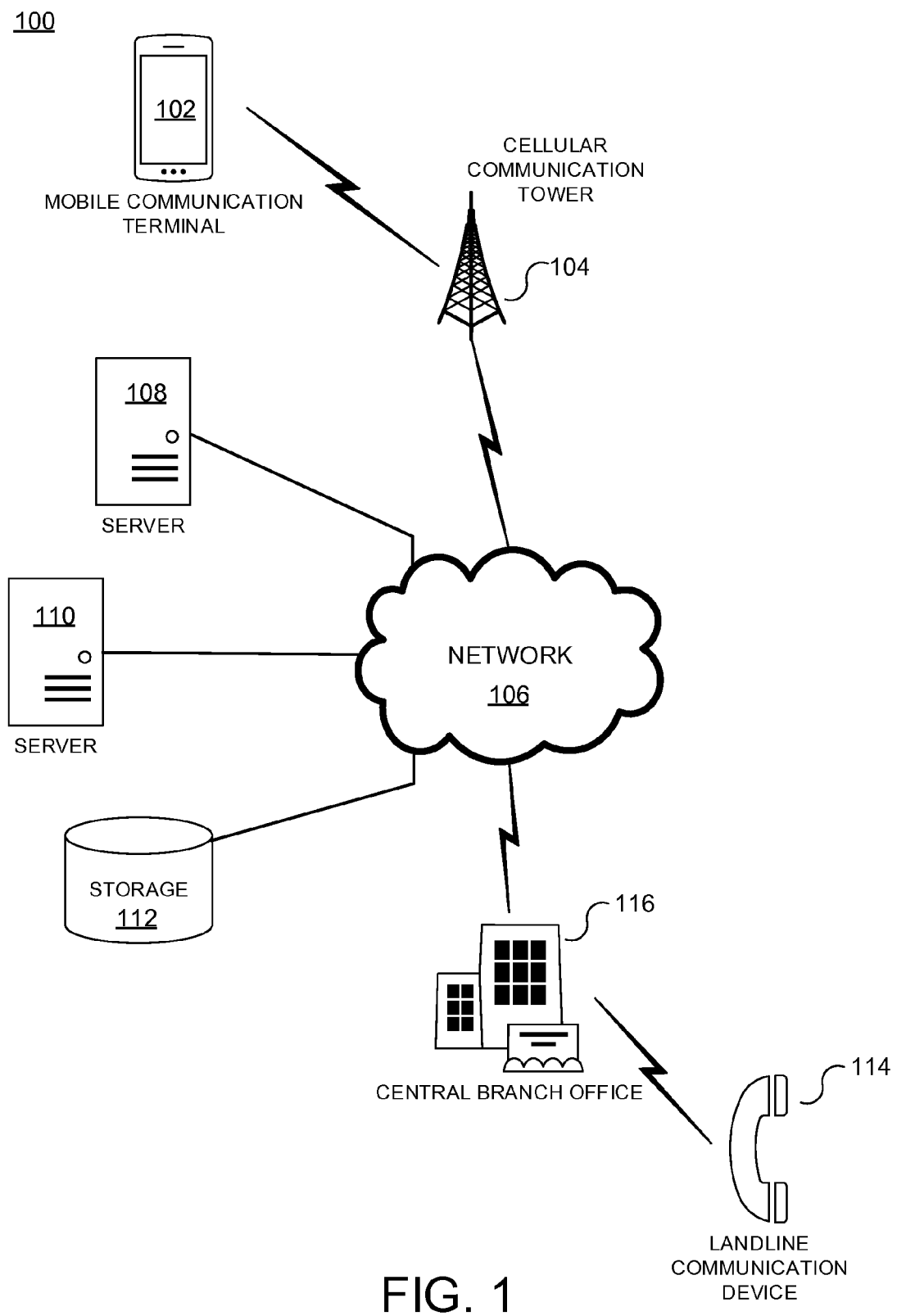
FIG. 1 is a representation of a telecommunication network, in accordance with an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The disclosure relates generally to telecommunications and more specifically to using an Integrated Services for Digital Network (ISDN) message header to convey a battery state about a mobile communication terminal. While the present disclosure is not necessarily limited to such applications, various aspects of the disclosure may be appreciated through a discussion of various examples using this context.

As used herein, a "receiver" is any device, or any combination of devices, capable of receiving an ISDN message, setting a subscriber account state, and determining and storing outgoing messages. For example, a receiver may be a computer system or server. A receiver may also be a voicemail system.

With reference now to the Figures, FIG. 1 is a pictorial representation of a telecommunication network 100 in which illustrative embodiments may be implemented. Telecommunication network 100 may be a network of computers, mobile communication terminals, landline communication devices, cellular communication towers, central branch offices, and other data processing devices in which the illustrative embodiments may be implemented. Telecommunication network 100 contains network 106, which is the medium used to provide communications links between the computers, mobile communication terminals, landline communication devices, cellular communication towers, central branch offices, and the other data processing devices connected together within telecommunication network 100. Network 106 may include connections, such as, for example, wired communication links, wireless communication links, and fiber optic cables.

In the depicted example, first server 108 and second server 110 connect to network 106, along with storage 112. First server 108 and second server 110 may be, for example, server computers with high-speed connections to network 106. In addition, first server 108 and second server 110 may provide a set of one or more services to client devices connected to network 106. For example, first server 108 and second server 110 may be receivers that provide one or more telecommunication system services, such as voicemail services, to the client devices connected to the network 106.

Mobile communication terminal 102 and landline communication device 114 also connect to network 106 via cellular communication tower 114 and central branch office 116, respectively. It should be noted that mobile communication terminal 102, landline communication device 114, cellular communication tower 104, and central branch office 116 represent a plurality of mobile communication terminals, landline communication devices, cellular communication towers, and central branch offices connected to network 106. Mobile communication terminal 102 and landline communication device 114 are clients of first server 108 and second server 110. In the depicted example, first server 108 and second server 110 may provide information, such as boot files, operating system images, and applications to mobile communication terminal 102 and landline communication device 114. First server 108 and second server 110 may also be receivers that provide voicemail services to mobile communication terminal 102 and landline communication device 114.

Mobile communication terminal 102 may be, for example, a smart phone, a cellular telephone, a desktop computer, a laptop computer, a handheld computer, a tablet, a personal digital assistant, or a gaming device with wireless communication links to network 106. Landline communication device 114 may be, for example, a standard handset telephone, a cordless handset telephone, or a desktop computer. It should be noted that mobile communication terminal 102 and landline communication device 114 may represent any combination of different mobile communication terminals and landline communication devices connected to network 106.

Cellular communication tower 104 may wirelessly connect to network 106. Cellular communication tower 104 is a fixed-location transceiver that wirelessly communicates directly with mobile communication terminal 102. Cellular communication tower 104 serves a cell within the telecommunication system. Typically, a mobile communication terminal connects with the nearest available cellular communication tower. A mobile communication terminal makes and receives calls through the cellular communication tower that the mobile communication terminal is currently connected to within a cell. A mobile communication terminal is able to move from cell to cell during an ongoing continuous communication by one cellular communication tower in one cell handing off or handing over the mobile communication terminal to another cellular communication tower in another cell.

Central branch office 116 connects to network 106 using wired connections. Central branch office 116 is a fixed-location telephone exchange or central office telephone switch used to connect and route telephone calls in a public switched telephone network (PSTN). Multiple telephone switches capable of handling hundreds of thousands of telephone calls per hour may be housed within central branch office 116. Landline communication device 114 connects to central branch office 116 via wire connections.

Storage 112 is a network storage device capable of storing data in a structured format or unstructured format. Storage 112 may provide storage of a plurality of different user names and associated identification numbers, user profiles, and user account information associated with the telecommunication system. Further, storage 112 may store other data, such as authentication or credential data that may include user names, passwords, and biometric data associated with each of the plurality of users or system administrators. Additionally, storage 112 may store voicemail information, such as one or more outgoing voicemail messages, a battery state, and received messages, associated with each of the plurality of users or system administrators in a subscriber account. It should be noted that storage unit 112 may include any data that may be utilized by the telecommunication system.

Also, it should be noted that telecommunication network 100 may include any number of additional server devices, mobile communication terminals, landline communication devices, cellular communication towers, central branch offices, storage devices, and other devices not shown. Program code located in telecommunication network 100 may be stored on a computer readable storage medium and downloaded to a computer or other data processing device for use. For example, program code may be stored on a computer readable storage medium on first server 108.

In the depicted example, telecommunication network 100 may be implemented as a number of different types of telecommunication networks, such as, for example, an internet, an intranet, a local area network (LAN), and a wide area network (WAN). FIG. 1 is intended as an example, and not as an architectural limitation for the different illustrative embodiments.

Figure 2:
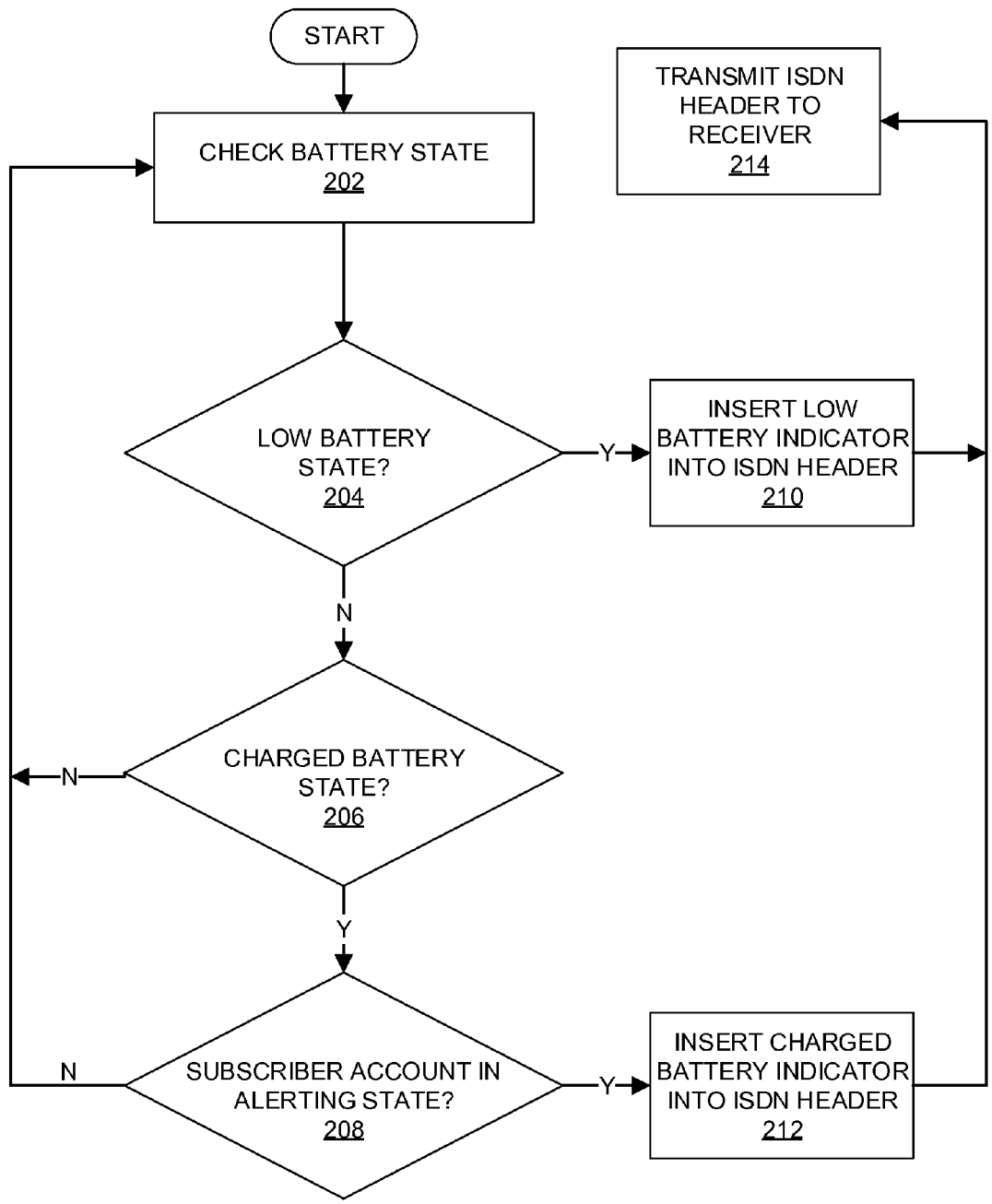
FIG. 2 is a flowchart of an example method for conveying a battery state about a mobile communication terminal to a receiver using Integrated Services for Digital Network (ISDN) headers, in accordance with an embodiment of the present disclosure.

Referring now to FIG. 2, shown is a flowchart of an example method 200 for conveying a battery state about a mobile communication terminal to a receiver using ISDN headers, in accordance with an embodiment of the present disclosure. In some embodiments, the method 200 may be performed by an application running on the mobile communication terminal 102 (shown in FIG. 1). The method may begin at operation 202, wherein the application may check the battery state of the mobile communication terminal.

After checking the battery state, the application may determine if the mobile communication device is in a low battery state per operation 204. In some embodiments, the application may check for a low battery state by comparing the battery state to predetermined battery thresholds. These battery thresholds may be set automatically by the application, e.g. by default the battery state may be a low battery state if it is holding less than a 10% charge. The battery thresholds may alternatively be configurable by the user through the application, e.g. the user could change the low battery threshold to a charge of 20%. In some embodiments, the application may determine the mobile communication terminal's battery state is a low battery state when the battery is below a threshold set by the mobile communication terminal's operating system. For example, many laptops and cell phones have a built-in threshold for a low battery state that triggers a warning to the user to charge the device.

If a determination is made that the mobile communication terminal's battery state is a low battery state at operation 204, a low battery indicator may be inserted into a battery state indicator field in an ISDN header at operation 210. A low battery indicator is any message in the ISDN header that indicates to the receiver that the mobile communication terminal's battery state is below a low battery threshold, i.e. near dead. Per operation 214, a call may then be made to a receiver, transmitting the ISDN header with the low battery indicator.

If the mobile communication terminal is determined to not be in a low battery state at operation 204, the application may determine if the mobile communication terminal's battery state is a charged battery state, per operation 206. Similar to operation 204, the application may compare the battery state to predetermined battery thresholds to determine if the phone is charged. Again, the battery thresholds may be default thresholds, configurable thresholds, or thresholds set by the mobile communication terminal's operating system. For example, in an embodiment, the user may set up the thresholds so that the mobile communication terminal is in the charged battery state whenever it has greater than 90% battery life remaining.

If a determination is made per operation 206 that the mobile communication terminal is not in the charged battery state, the application may continue the cycle and begin another battery state check per operation 202. In some embodiments, the application may not begin another cycle immediately; instead, it may wait some amount of time before restarting the process 200. This may be advantageous because it may require less power, thereby draining the battery slower than if the cycle repeated continuously without breaks.

If a determination is made per operation 206 that the mobile communication terminal's battery state is a charged battery state, the application may determine if a subscriber account at the receiver is in the alerting state, per operation 208. This may be done by, e.g. saving, on the mobile communication terminal, information relating to the last call to the receiver by the mobile communication terminal. For example, the application may store, on the mobile communication terminal, the ISDN header that was last transmitted to the receiver. If the last sent header includes the low battery indicator, the application may recognize that the subscriber account is already in the alerting state. If, however, the last sent header includes the charged battery indicator, the application may recognize that the subscriber account is in a first state. Any other method for determining whether the subscriber account is in the alerting state may alternatively be used.

If, at operation 208, it is determined that the subscriber account is not in the alerting state, the application may continue the cycle and begin another battery state check per operation 202. As before, in some embodiments, the application may not begin another cycle immediately, and, instead, may wait a predetermined amount of time before restarting the process 200.

If a determination is made at operation 208 that the subscriber account is in the alerting state, per operation 212 a charged battery indicator may be inserted into the battery state indicator field in an ISDN header. A charged battery indicator is any message in the ISDN header that indicates to the receiver that the mobile communication terminal's battery state is above a charged battery threshold, i.e. charged. Per operation 214, a call may be placed to the receiver, transmitting the ISDN header with the charged battery indicator.

After the call is made to the receiver at operation 214, transmitting the ISDN header with either a low battery indicator or a charged battery indicator, the application may continue the cycle and begin another battery state check per operation 202. As before, in some embodiments, the application may not begin another cycle immediately and, instead, may wait a predetermined amount of time before restarting the process 200. In some embodiments, the battery state indicator may be appended to another field within the ISDN header, e.g. the caller ID field, instead of inserted into a special battery state indicator field.

In some embodiments, all the operations in method 200 are performed by the same application on the mobile communication terminal. In other embodiments, the operations may be performed by two or more applications. For example, a first application may monitor the battery state, and, when a battery threshold is hit, trigger a second application to insert the battery state indicator into the ISDN header and make the call to the receiver. In another example, a first application may monitor the battery state, insert the appropriate battery state indicator into the ISDN header, and then have a second application (e.g. the default phone application) place the call. In addition to placing the call over a cellular network, the call may be made using any other known method for transmitting voice communications, e.g. over the Internet using VoIP.

Figure 3:
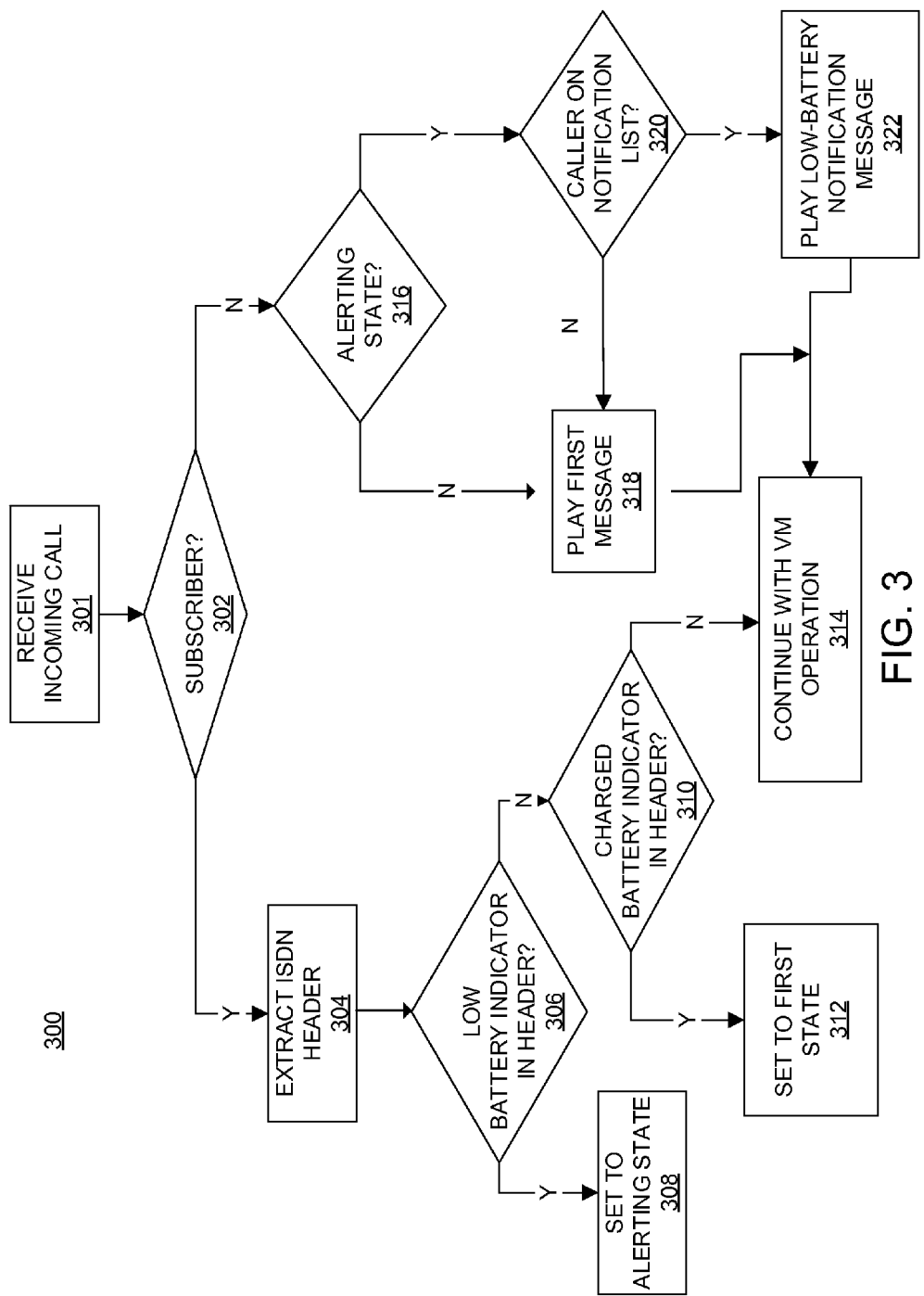
FIG. 3 is a flowchart of an example method for conveying a battery state about a mobile communication terminal to a caller using ISDN headers and a receiver, in accordance with an embodiment of the present disclosure.

Referring now to FIG. 3, shown is a flowchart of an example method 300 for storing a battery state by a receiver using ISDN headers, and conveying a battery state to a third-party caller using prerecorded voicemail messages. The method may begin with operation 301, wherein the receiver accepts an incoming call. At operation 302, the receiver determines if an originating caller is a subscriber associated with a subscriber account. In other words, the receiver determines whether the caller is trying to reach his own subscriber account, e.g., to listen to his messages, or if the caller is a third-party and trying to leave a message.

The receiver may determine whether a caller is a subscriber using any known or discovered method. For example, a Mobile Telephone Switching Office (MTSO) may signal to the receiver through a data-link that it is forwarding the call after the intended recipient did not answer, indicating that the caller is not a subscriber. Alternatively, the receiver may direct the caller to enter a Personal Identification Number (PIN) to indicate that the caller is a subscriber. The present disclosure does not require, and should not be limited to the use of, any specific method for determining whether a caller is a subscriber.

If the receiver determines at operation 302 that the incoming caller is a subscriber, the receiver may extract the ISDN header from the call at operation 304. At operation 306, the receiver may check the ISDN header for a low battery indicator. The low battery indicator may be one or more characters recognized by the receiver and the mobile communication terminal, or an application running on the mobile communication terminal, as indicating that the mobile communication terminal's battery state is a low battery state. In an embodiment, the low battery indicator may be stored in a battery state indicator field within the ISDN header. Alternatively, the low battery indicator may be appended to another field within the ISDN header, e.g. the caller ID field.

If, at operation 306, the receiver determines that the low battery indicator is present in the ISDN header, per operation 308 the subscriber account for the mobile communication terminal may be set to an alerting state, indicating that the mobile communication terminal is in a low battery state. The state of the mobile communication terminal may be stored on the receiver, or on a server or other storage device connected to the network. After setting the subscriber account to the alerting state, the call may be ended.

If the receiver determines at operation 306 that the low battery indicator is not present in the ISDN header, the receiver may check for a charged battery indicator per operation 310. If, per operation 310, the charged battery indicator is present in the ISDN header, the subscriber account may be set to a first state per operation 312, and the call may be ended. If, per operation 310, a determination is made that the charged battery indicator is not in the ISDN header, the receiver may continue with voicemail operations per operation 314, e.g. the caller may listen to received messages.

If the receiver determines at operation 302 that the caller is not the subscriber, the receiver may determine if the subscriber account is in the alerting state per operation 316. As before, the battery state may be stored on the receiver, or on another server or storage device connected to the receiver through the network 106. If the receiver determines at operation 316 that the subscriber account is not in the alerting state, per operation 318 the receiver may play a first message and continue with voicemail operations, e.g. allow the caller to leave a message after hearing the first message. As used herein, a first message is any voicemail message other than a low-battery notification message. For example, the first message may be a default message created the receiver when a user activates voicemail services. The first message may also be a user recorded message meant to notify a caller that the user is unavailable.

If the receiver determines at operation 316 that the subscriber account is in the alerting state, the receiver may determine whether the caller is on a notification list per operation 320. The notification list may be a list of phone numbers or names, stored by the receiver or elsewhere on the network, corresponding to callers approved to receive the low battery notification message. If, at operation 320, the receiver determines that the caller is not on the notification list, the receiver may play the first message 318 and continue with voicemail operations 314. If, per operation 320, the receiver determines that the caller is on the notification list, the receiver may play the low battery notification message 322 and then continue with voicemail operations 314.

In some embodiments, after playing the low battery notification message 322, the receiver may play the first message 318 before continuing with voicemail operations 314.

In some embodiments, the low battery notification message may be played to all callers when the subscriber account is in the alerting state. In another embodiment, the notification list may act as a blacklist or block list, instead of a whitelist, and the low battery notification message may be played to all callers except for those on the notification list when the subscriber account is in the alerting state.

In some embodiments, all the operations in method 300 may be performed by one application or module running on one receiver. In some embodiments, the operations in method 300 may be performed by multiple applications or modules running on one receiver. For example, in an embodiment of the present disclosure, an application on the receiver may include four modules: a call-receiving module, a subscriber module, a battery state module, and a voicemail notification module.

The call-receiving module may include instructions to alert the receiver when an incoming call is detected, i.e. perform operation 301. The receiver may then run the subscriber module, which may include instructions to determine whether a caller to the receiver is a subscriber, i.e. perform operation 302. If the receiver determines that the caller is the subscriber, the receiver may run the battery state module, which may include instructions to detect the presence of a battery state indicator, such as a low battery indicator or a charged battery indicator, and instructions to set the state of the subscriber account, i.e. perform operations 304-312. If the caller is not the subscriber, the receiver may run the voicemail notification module, which may include instructions to determine whether the subscriber account is in the alerting state, determine which outgoing voicemail message is appropriate, and play an outgoing message, such as a low battery notification message, i.e. perform operations 316-322.

In other embodiments, the operations may be performed by two or more receivers. For example, a first receiver may be configured to determine whether the caller is a subscriber, extract the ISDN header from a subscriber's call, and set the subscriber account to either the alerting state or the first state. In the event that the caller is not a subscriber, the first receiver may transfer the call to a second receiver, which is responsible for determining and playing the appropriate voicemail message.

Figure 4:
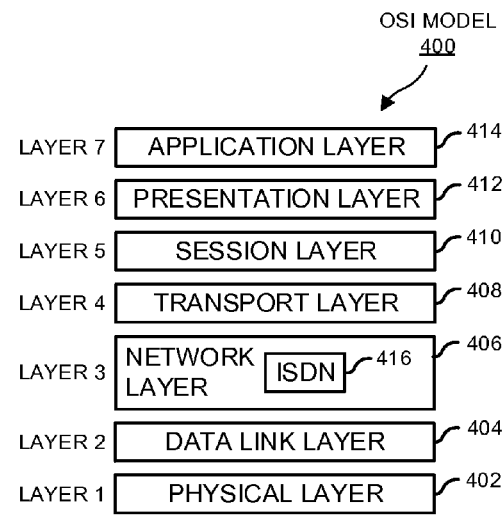
FIG. 4 is a diagram illustrating ISDN within the Open Systems Interconnection (OSI) model, in accordance with an embodiment of the present disclosure.

With reference now to FIG. 4, a diagram illustrating ISDN within an Open Systems Interconnection (OSI) model is depicted in accordance with an illustrative embodiment. OSI model 400 may be implemented in a network of data processing systems, such as, for example, telecommunication network 100 in FIG. 1. OSI model 400 is a conceptual model that characterizes and standardizes internal functions of a telecommunications system by partitioning the model into abstraction layers.

OSI model 400 groups telecommunication functions into seven logical layers, layer one through layer seven with layer one at the bottom of the model. For example, physical layer 402 is layer one, data link layer 404 is layer two, network layer 406 is layer three, transport layer 408 is layer four, session layer 410 is layer five, presentation layer 412 is layer six, and application layer 414 is layer seven. In OSI model 400, each layer serves a layer above it and is served by the layer below it. For example, network layer 406 serves transport layer 408 and is served by data link layer 404.

Network layer 406 provides the functional and procedural means to transfer messages from one device to another device connected to the same network, such as network 106 in FIG. 1. Network layer 406 includes ISDN 416, according to this embodiment. ISDN 416 is a set of telecommunication standards for simultaneous digital transmission of voice, video, data, and other telecommunication system services over circuits of a public switched telephone network (PSTN). Although ISDN 416 services a public switched telephone network, ISDN 416 also provides services to packet switched networks, telex networks, cable television (CATV) networks, and the like.

Figure 5:
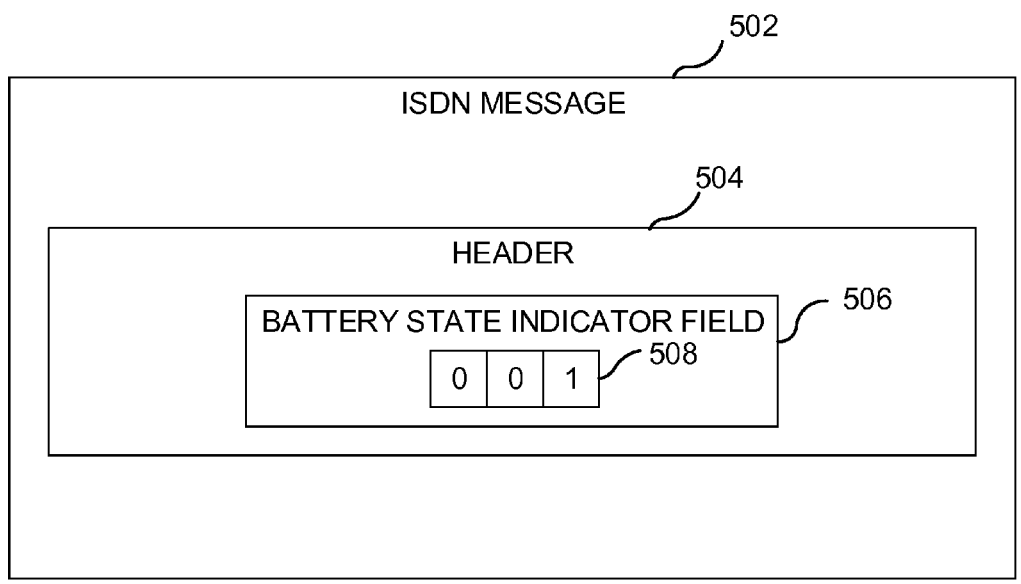
FIG. 5 is a representation of an ISDN message with a battery state indicator field within the header, and a battery state indicator within the battery state indicator field, in accordance with an embodiment of the present disclosure.

Referring now to FIG. 5, shown is an ISDN message with a header that contains a battery state indicator field. ISDN message 502 may be, for example, a call setup message, call acknowledgement or call connect message, or a call reject message that corresponds to a voice telecommunication within a telecommunications network.

ISDN message 502 includes header 504. Header 504 includes routing information and other specific information associated with ISDN message 502. In this example, an ISDN message manager application, inserts a three-character battery state indicator field 506 within header 504. Three-character battery state indicator field 506 is a special field within header 504 that contains a battery state, such as a low battery indicator or a charged battery indicator.

An ISDN message manager application is any application or software implementation that is capable of editing an ISDN message, or an ISDN message header. For example, the application, or one of the applications, that performs method 200 (shown in FIG. 2) may be an ISDN message manager application.

It should be noted that in an alternative embodiment, the ISDN message manager application may insert the three-character battery state indicator 508 into an already existing field within the header 504, such as in a caller ID field, instead of inserting a three-character battery state indicator field 506 to specifically store the three-character battery state indicator 508.

Figure 6:
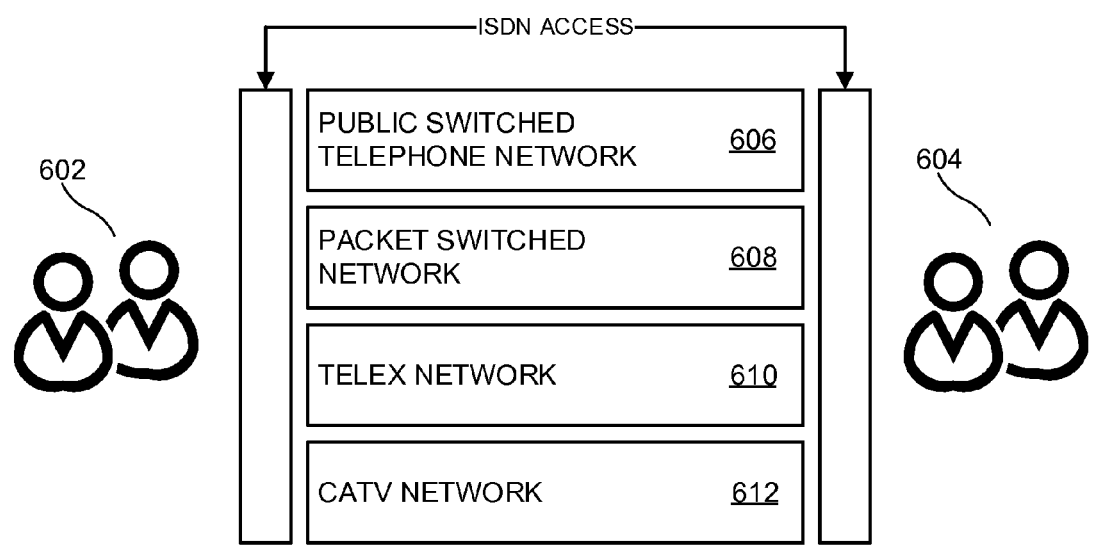
FIG. 6 is a diagram illustrating ISDN access, in accordance with an embodiment of the present disclosure.

With reference now to FIG. 6, a diagram illustrating ISDN access is depicted in accordance with an illustrative embodiment. ISDN access 600 may be implemented in a network layer of an OSI model, such as, for example, ISDN 416 in network layer 406 of OSI model 400 in FIG. 4. ISDN access 600 is an example of how first users 602 can communicate with second users 604 via one or more networks, such as public switched telephone network 606, packet switched network 608, telex network 610, and CATV network 612.

First users 602 and second users 604 utilize mobile or landline communication devices, such as mobile communication terminal 102 in FIG. 1, to place and receive telecommunications. ISDN access 600 utilizes ISDN messages, such as ISDN message 502 in FIG. 5, to set up and tear down connections for the telecommunications between first users 602 and second users 604 via one or more of public switched telephone network 606, packet switched network 608, telex network 610, and CATV network 612.

Figure 7:
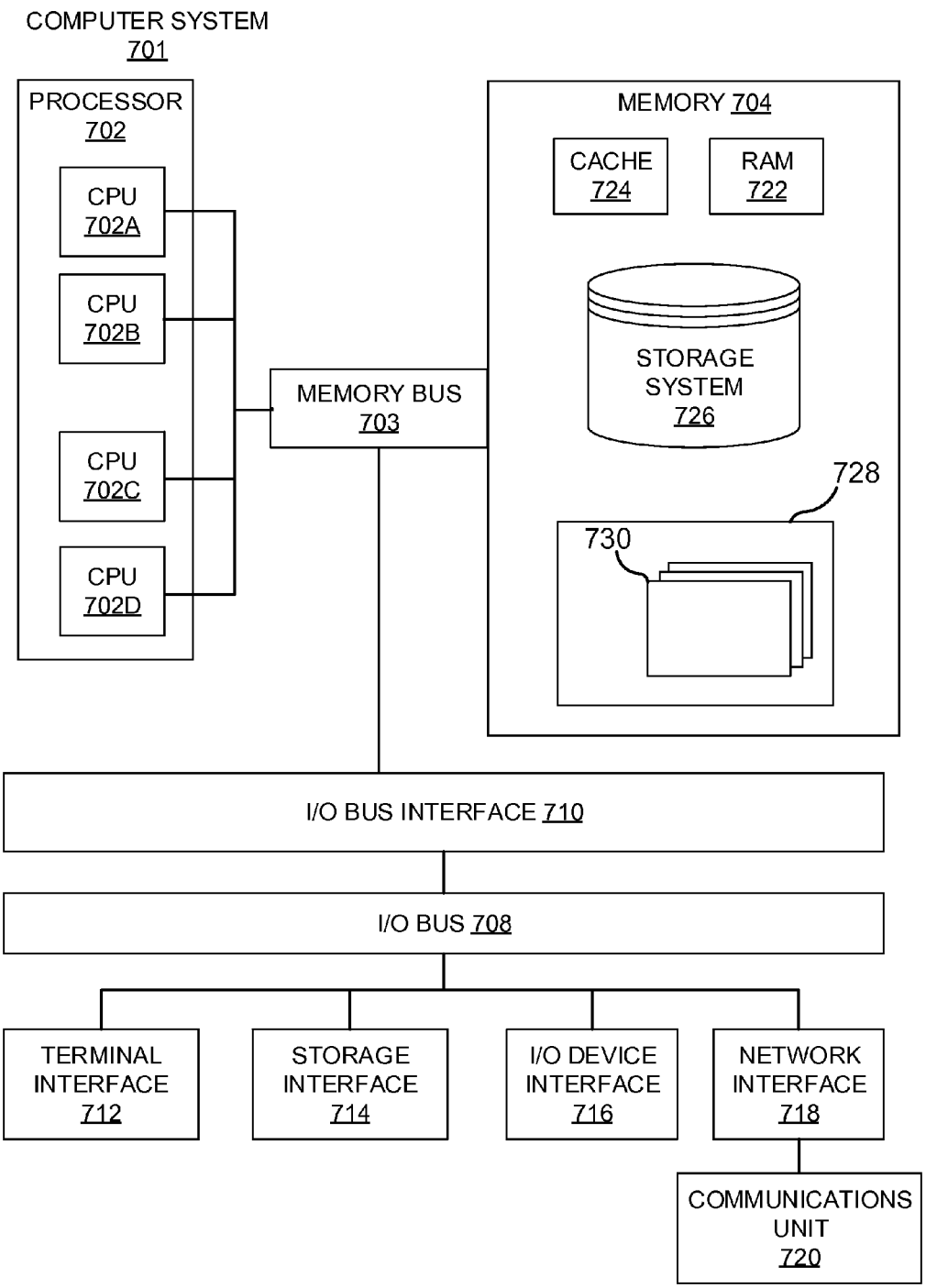
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system (e.g. a receiver) 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

For example, in an embodiment of the present disclosure, the program modules 730 may include a call receiving module, a subscriber module, a battery state module, and a voicemail notification module. The call receiving module may include instructions to alert the computer system 701 when an incoming call is detected. The subscriber module may include instructions to determine whether a caller to a receiver is a subscriber of that system. The battery state module may include instructions to detect the presence of a battery state indicator, such as a low battery indicator or a charged battery indicator, and instructions to set the state of the subscriber account. The voicemail notification module may include instructions to determine the state of the subscriber account, determine which outgoing voicemail message is appropriate, and to play an outgoing message, such as a low battery notification message.

A communications unit 720 may be connected to the network interface to provide for communication with mobile communication devices, landline communication devices, computing devices, and other data processing systems via the telecommunication network 100. Communications unit 720 may provide communications through the use of either or both physical and wireless communications links. The physical communications link may utilize, for example, a wire, cable, universal serial bus, or any other physical technology to establish a physical communications link. The wireless communications link may utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for conveying a battery state to a caller, the method comprising:
   receiving, by a voicemail system and from a mobile communication terminal, a call directed to a subscriber account at the voicemail system;
   determining whether the call was placed by a subscriber, the subscriber being associated with the subscriber account, wherein determining whether the call was placed by the subscriber includes determining, using information received from a mobile telephone switching office, whether the call was forwarded to the voicemail system after a recipient did not answer;
   responsive to the voicemail system determining that the call was not placed by the subscriber, determining whether the subscriber account is in an alerting state;
   responsive to determining that the call was not placed by the subscriber and that the subscriber account is in the alerting state, determining whether the caller is on a notifications list
   responsive to determining that the subscriber account is in the alerting state and that the caller is on the notifications list, transmitting a low battery notification message to the caller and continuing with voicemail operations;
   responsive to determining that the call was placed by the subscriber, the method further comprising:
      extracting an Integrated Services for Digital Network (ISDN) header from the call;
      determining whether the ISDN header includes a low battery indicator; and
      responsive to determining that the ISDN header includes the low battery indicator, setting the subscriber account to an alerting state.

2. The method of claim 1, further comprising:
   responsive to determining that the ISDN header does not include the low battery indicator, determining whether the ISDN header includes a charged battery indicator; and
   responsive to determining that the ISDN header includes the charged battery indicator, setting the subscriber account to a first state.

3. The method of claim 2, further comprising:
   responsive to determining that the ISDN header does not include the charged battery indicator, continuing with voicemail operations.

4. The method of claim 1, the method further comprising:
   responsive to determining that the caller is not on the notifications list, transmitting a first voicemail message to the caller.

5. The method of claim 1, the method further comprising:
   storing, in memory communicatively coupled to the voicemail system, a first voicemail message and a low battery notification message for the subscriber account, the first voicemail message being associated with a first state and the low battery notification message being associated with the alerting state.

6. The method of claim 1, wherein the determining whether the ISDN header includes the low battery indicator includes:

identifying a battery state indicator within the ISDN header, wherein the battery state indicator is appended to a caller ID field of the ISDN header; and determining whether the battery state indicator is the low battery indicator.

7. A system comprising:

a memory having a first voicemail message and a low battery notification message for a subscriber account, the first voicemail message being associated with a first state and the low battery notification message being associated with an alerting state;

a mobile communication terminal configured to perform a method comprising:
 determining a battery state of the mobile communication terminal;
 generating a battery state indicator by comparing the battery state to one or more battery thresholds;
 inserting the battery state indicator into a battery state indicator field within a header of an Integrated Services for Digital Network (ISDN) message; and
 sending the ISDN message with the battery state indicator to a processor; and the processor, wherein the processor is configured to:
 receive, by a voicemail system and from the mobile communication terminal, a call directed to the subscriber account at the voicemail system;
 determine whether the call was placed by a subscriber, the subscriber being associated with the subscriber account, wherein determining whether the call was placed by the subscriber includes determining, using information received from a mobile telephone switching office, whether the call was forwarded to the voicemail system after a recipient did not answer;
 extract, in response to determining that the call was placed by a subscriber, the ISDN header from the call;
 determine whether the ISDN header includes a low battery indicator;
 set, in response to determining that the ISDN header includes the low battery indicator, the subscriber account to the alerting state;
 determine, in response to determining that the ISDN header does not include the low battery indicator, whether the ISDN header includes a charged battery indicator; and
 set, in response to determining that the ISDN header includes the charged battery indicator, the subscriber account to the first state, wherein the call was sent by a caller.

8. The system of claim 7, wherein the processor is further configured to:
 continue, responsive to determining that the ISDN header does not include the charged battery indicator, with voicemail operations.

9. The system of claim 7, wherein the processor is further configured to:
 determine, responsive to determining that the call was not placed by the subscriber, whether the subscriber account is in the alerting state; and
 determine, responsive to determining that the subscriber account is in the alerting state, whether the caller is on a notifications list.

10. The system of claim 9, wherein the processor is further configured to:
 transmit, responsive to determining that the caller is not on the notifications list, the first voicemail message to the caller.

11. The system of claim 9, wherein the processor is further configured to:
 transmit, responsive to determining that the caller is not on the notifications list, the low battery notification message to the caller.

* * * * *